United States Patent [19]

Gutjahr

[11] Patent Number: 5,074,772
[45] Date of Patent: Dec. 24, 1991

[54] MOLD FOR INJECTION MOLDED PARTS MADE OF PLASTICIZABLE MATERIAL

[75] Inventor: Lothar Gutjahr, Malterdingen, Fed. Rep. of Germany

[73] Assignee: Klöckner-Ferromatik Desma GmbH, Malterdingen, Fed. Rep. of Germany

[21] Appl. No.: 595,573

[22] Filed: Oct. 11, 1990

[30] Foreign Application Priority Data

Oct. 12, 1989 [DE] Fed. Rep. of Germany ....... 3934115

[51] Int. Cl.$^5$ .............................................. B29C 45/13
[52] U.S. Cl. .................................... 425/130; 264/37; 264/328.8; 264/328.13; 425/573
[58] Field of Search .............................. 425/130, 573; 264/69.37, 328.7, 328.8, 328.13

[56] References Cited

U.S. PATENT DOCUMENTS

| | | | |
|---|---|---|---|
| 4,867,672 | 9/1989 | Sorensen | 264/328.7 |
| 4,925,161 | 5/1990 | Allan et al. | 425/573 |
| 4,994,220 | 2/1991 | Gutjahr et al. | 264/69 |

FOREIGN PATENT DOCUMENTS

| | | | |
|---|---|---|---|
| 0166038A1 | 1/1986 | European Pat. Off. | |
| 0205710A2 | 12/1986 | European Pat. Off. | |
| 1177326 | 9/1964 | Fed. Rep. of Germany | 425/130 |
| 3810954 | 3/1988 | Fed. Rep. of Germany | |
| 58-1536 | 1/1983 | Japan | 425/130 |

*Primary Examiner*—Timothy Heitbrink
*Attorney, Agent, or Firm*—Watson, Cole, Grindle & Watson

[57] ABSTRACT

An injection mold unit is provided for an alternate feed, injection molding of parts of a plasticized material and has first and second plasticizing and injection devices, with a respective bores and a mold comprising a heating channel block and a mold cavity. The heating channel has a first passageway connected to the bore of the first plasticizing and injection device, the first passageway having first and second branches in fluid communication with the mold cavity. The heating channel also has as well as a second passageway connected to the bore of the second plasticizing and injection machine and having first and second branches in fluid communication with the mold cavity. One way valves are located in each of the first and second branches of the first and second passageways. The one way valves respectively located in the first branches of the first and second passageways control a flow of plasticized material in a first direction from one of the plasticizing and injection devices, through the mold cavity, and to the other plasticizing and injection device. The one way valves respectively located in the second branches of the first and second passageways controlling a flow of plasticized material in a second direction from the other plasticizing device, through the mold cavity, and to the one plasticizing and injection device, whereby plasticized material is alternately fed to and through the mold cavity.

5 Claims, 6 Drawing Sheets

MOLD FOR INJECTION MOLDED PARTS MADE OF PLASTICIZABLE MATERIAL

BACKGROUND OF THE INVENTION

1. Technical Field of the Invention

The present invention relates to a mold for the injection molding of parts made of plasticizable material, in particular made of plasticizable liquid crystal polymers, wherein the mold comprises at least two gates, each of which has an assigned plasticizing and injection unit.

2. Discussion of the Related Art

As used herewith, plasticizable material encompasses the usual plasticizable thermoplastics; granulated mixtures that are completely reacted into polyurethane and comprise isocyanate and polyol; unburned ceramic compounds with added organic lubricants; elastomers; filled plastic material further comprising added glass fibers, carbon fibers, metal powders, etc.; and other known plasticizable materials.

To date, when injection molded parts are injection molded, plasticized material is generally injected into the cavity of a closed mold by means of a gate, and the shrinkage that can not generally be neglected when the injection molded part is cooling is compensated for by the further addition of plasticizable material. According to this general principle, injection molded parts are also manufactured of different plastic materials, i.e., multi-component injection. Since, apart from the gate, plasticized material is always injected into a self-contained cavity depending on the geometry, the dimensions, and the wall thickness of the injection molded part, significant injection pressures for manufacturing faultless injection molded parts and also correspondingly high mold clamping pressures are necessary in order to prevent the mold from opening.

To date attention has been paid substantially to controlling or regulating the sequence of the injection process to manufacture faultless injection molded parts that are true to size or dimensions. However, with these measures it is not possible and also not intended for the plasticized material to flow specifically into the cavity for the purpose of a predetermined orientation, e.g., of the neutral fibers to result in optimal mechanical strength or load-bearing capacity of the injection molded parts.

When injection molded parts such as push rods for motor vehicles, etc. are manufactured, it is known from European patent application 0205 710 to use molds with several gates and to provide a plasticizing and injection unit for each gate respectively in order to avoid a reliable filling of the mold during the injection operation and, moreover, to avoid freezing of the plasticized material in the gates.

Furthermore, it is known from European patent application 0166 038 to manufacture injection molded parts of plasticized liquid crystal polymers, whose molecular chains orient themselves in the flow direction of the plasticized material injected into the mold. To this end, molds with two gates are used that form a closed system with a plasticizing and injection unit so that when plasticized material is injected into the cavity, it flows in part into the second gate after the mold has been filled and the molecular chains are oriented in the cavity by means of the resulting laminar current.

From other fields of technology, e.g., in the case of forged pieces, it is known to target an optimal strength or load-carrying capacity of the tool through a suitable setting of the fiber flow.

A process to injection mold parts made of plasticizable material, in particular plasticizable liquid crystal polymers, is known from the West German Patent application P 38 10 954.9, which corresponds to U.S. Pat. No. 4,994,220 the specification of which is hereby specifically incorporated by reference. The plasticized material is injected into a closed mold with at least two gates, each of which has an assigned plasticizing and injection unit. Any shrinkage of the injection molded parts that are cooling down is compensated for through an additional optional supply of material. To fill the cavity of the plasticized material the plasticized material, flows through the one plasticizing and injection unit via the one gate into the cavity and continues to flow in part via the other gate in the direction of the other plasticizing and injection unit. To set a specific fiber orientation or stress curve, the two plasticizing and injection units feed alternatively plasticized material to the cavity while the cavity is being filled.

The plasticized material flows into the cavity through the one gate and, during the filling of cavity, alternatively flows through the other gate in the direction of the other plasticizing and injection unit. Thus, the hydraulic pressures acting on the plasticizing and injection screws are specified in such a manner that the plasticizing material is under a set pressure. While the one plasticizing and injection screw moves in the direction of its assigned gate, the other plasticizing and injection screw moves away from its assigned gate, whereby it can also plasticize granulated material. Upon filling the mold, further axial movement of both plasticizing and injection screws is stopped and a corresponding pressure, under which the injection molded part cools with or without compensation for shrinkaqe, is applied to one or both plasticizing and injection screws. At the same time, a build-up of the usual high mold internal pressure during filling of the cavity is avoided so that even the previously usual high mold clamping pressures are no longer necessary.

It is especially advantageous if, through the specific arrangement of the two gates with respect to the geometry and dimensions of the cavity, a specific flow pattern of the plasticized material in the cavity is achieved and the orientation of the fibers, in particular the orientation of the neutral fibers, can be specified. Another significant advantage lies in the fact that long molecules or molecular chains and glass fibers, carbon fibers etc orient themselves in the direction of flow and thus significantly increase the part strength.

This alternate feeding can take place in such a manner that the two plasticizing and injection units feed the entire requisite mass to manufacture an injection molded part in partial quantities to the cavity wherein the flow direction reverses from time to time. Especially with long molecular chains, orientation in the flow direction occurs without more effort due to the multiple reversal of direction of the flow direction. If, upon filling the cavity by means of the two plasticizing and injection units, the plasticized material is moved back and forth as a function of the cooling rate of the injection molded parts, the injection molded part cools down from the mold inner wall in the direction of the interior of the injection molded part. In this case shear sections are formed in which the orientation of the molecules or molecular chains takes place so that in the ideal case an orientation of the molecules and the targeted flow of the fibers over the entire cross section is achieved.

The intervals for moving the plasticized material back and forth can generally be separated from one another through pauses so that the speed of the material flowing back and forth can be controlled over a wide range due to the mass moment of inertia to achieve a surprisingly optimal orientation of the molecules or the molecular chains.

In principle it is possible to arrange the two gates of a closed mold diametrically opposite one another so that the cavity has a function similar to a gate while the plasticized material is flowing. Such a design is especially advantageous for injection molded parts having cylindrical or rotational symmetry.

In general, the gates car be arranged in any arbitrary manner with respect to one another and, in particular, take into account the geometry of the cavity so that the correspondingly specified fiber orientation or stress curve in the injection molded part is obtained. Thus, for example, when L-shaped profiles are being extruded, it is advantageous to have the axes of the gate intersect at a 90° angle so that when the L-shaped profiles are injection molded the fibers have an L-shaped orientation.

Plasticized material for changing the flow direction in the cavity can be fed in particular over at least one other pair of gates alternately to the first pair of gates so that through these measures the injection molded part is extruded in two layers. By means of the suitable arrangement and orientation of the second pair of gates it is possible to set the fiber orientation or stress curve of the second layer in such a manner that it is displaced by 90° with respect to the direction of the fiber and/or the stress of the first layer.

In principle it is possible to extrude injection molded parts comprising several layers according to the principle of the multilayered plate by means of a suitable arrangement of additional pairs of gates, where the fiber orientation of the successive layers is staggered with respect to one another. In principle it is also possible to orient pairs of gates in successive planes and alternately in different directions and then to extrude the injection molded part in successive layers.

Furthermore, while the plasticized material is flowing in the direction of the one or the other plasticizing and injection unit, the cavity can be vented. The plasticized material flowing into the cavity and flowing or in the direction of the other plasticizing and injection unit moves the air located in the cavity in front of itself and delivers it on its flow-way at a suitable point via a valve to the environment.

In principle, in the simplest case at least two plasticizing and injection units and a mold with at least two gates are used, wherein to extrude the injection molded parts the cavity of the mold is connected so as to communicate with the plasticizing and injection units via the gates. By communicating connection is understood that the plasticized material of both plasticizing and injection screws is injected alternately into the cavity and also flows in a controlled manner alternately in the direction of one or the other plasticizing and injection unit. With these measures the plasticized material can be fed to the cavity with a set pressure differential exerted by the plasticizing and injection screws.

SUMMARY OF THE INVENTION

The invention is based on the problem of providing a mold to carry out this process, the mold being simple in design and without additional effort being clampable on the mold platens of injection molding machines, unlike previously known molds. This problem is solved according to a first embodiment when to fill the cavity with the plasticized thermoplastic material that is to be fed in alternately by means of the two plasticizing and injection units, the mold comprises a heating channel block with at least two bores. One bore is connected to one gate and the other bore is connected to the other gate and both bores of each heating channel block empty into bores leading to the assigned plasticizing and injection units. Each of the two bores has a one-way valve that opens or closes in the opposite direction as a function of the assigned plasticizing and injection unit.

In another embodiment of this design principle, the heating channel block comprises a first passageway with the one gate emptying into the cavity and a second passageway with the other gate emptying into the cavity. The passageways are connected to the first and second plasticizing and injection units via gate segments or branches and the one-way valves are arranged in the gate segments.

In another embodiment of these design principles, the mold also has at least one movable core that carries the molded part contours and that permits thin layers to be extruded in order to then enable a continuous and clean build up of layers through an increase in the wall thickness. This goal is obtained according to a second design principle in that the mold comprises two pairs of gates, where the two axes of both pairs are arranged in two parallel planes and their projection encloses a defined angle in the one plane, and in that the heating channel block comprises bores and the bores empty into the other bores.

According to both embodiments a mold is provided that is simple in design and that permits clamping, wherein in the design of the heating channel blocks, the molds that are present as functional units are provided with other gates to form, with the functional units, the molds of the invention according to the mechanical assembly technique.

BRIEF DESCRIPTION OF THE DRAWINGS

The invention is explained in further detail with reference to the drawings, wherein.

DETAILED DESCRIPTION OF THE PREFERRED EMBODIMENTS

The present invention provides a mold used in a process to injection mold parts made of a plasticizable material, in particular, a plasticizable liquid crystal polymer. The plasticized material is injected into a closed injection mold with a first gate and a second gate. Each gate has an assigned plasticizing and injection unit. Shrinkage of injected molded part during cooling may be compensated for by the supply of additional material. Injection is carried out by at least one first device which causes the material to flow into the cavity via a first gate associated therewith. The materials fills the cavity and partially flows from the cavity via a second gate in the direction of a second plasticizing and injection unit. The mold used with such a process provides injection molded parts made of plasticizable material, in particular plasticizable liquid crystal polymers, in which a specific fiber and stress orientation is achieved. This is achieved by filling the cavity in a manner wherein the two plasticizing and injection units alternately feed plasticized material to the cavity.

U.S. Pat. No. 4,994,220 discloses a process wherein plasticized material flows through a first gate in the direction of a second plasticizing and injection unit. During this process hydraulic pressure acting on the plasticizing and injection screws of the devices is preset in such a manner that the plasticized material is under a predetermined pressure. While the first plasticizing and injection screw delivers the material in the direction of its associated gate, the second plasticizing and injection screw moves material away from its associated gate during which it can plasticize the granulated material fed into the second plasticizing and injection unit. After the mold cavity has been filled, the further axial movement effected by the two plastification and injection screws is stopped. At one or both plastification and injection screws a corresponding pressure is applied under which the injection molded part is cooled while shrinkage is compensated for, if desired. The buildup of typically high internal pressures in the closed injection mold while filling the mold cavity is avoided by the approach taken according to the invention of U.S. Pat. No. 4,994,220 so that conventional high mold locking pressure is not required.

Figure 1:
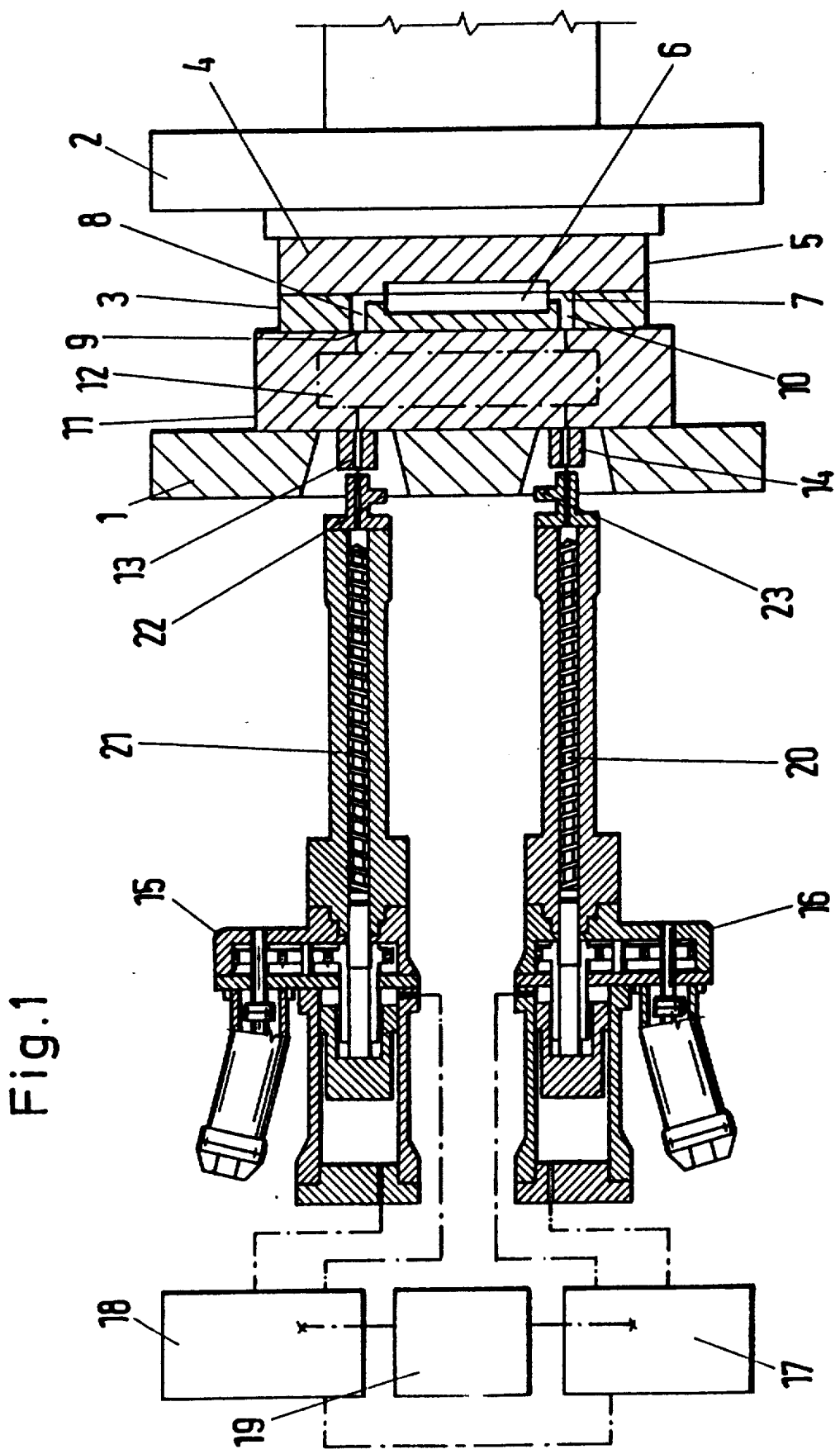
FIG. 1 is a partial schematic diagram of a mold with the heating channel block.

Referring to FIG. 1, stationary mold platens and mold platens that can be moved on tie bars (not illustrated) are denoted as 1 and 2 respectively. Mold halves 3 and 4 of mold 5 are clamped on the sides of the platens facing one another. When the mold is in the closed position, the two mold halves define cavity 6.

Figure 2:
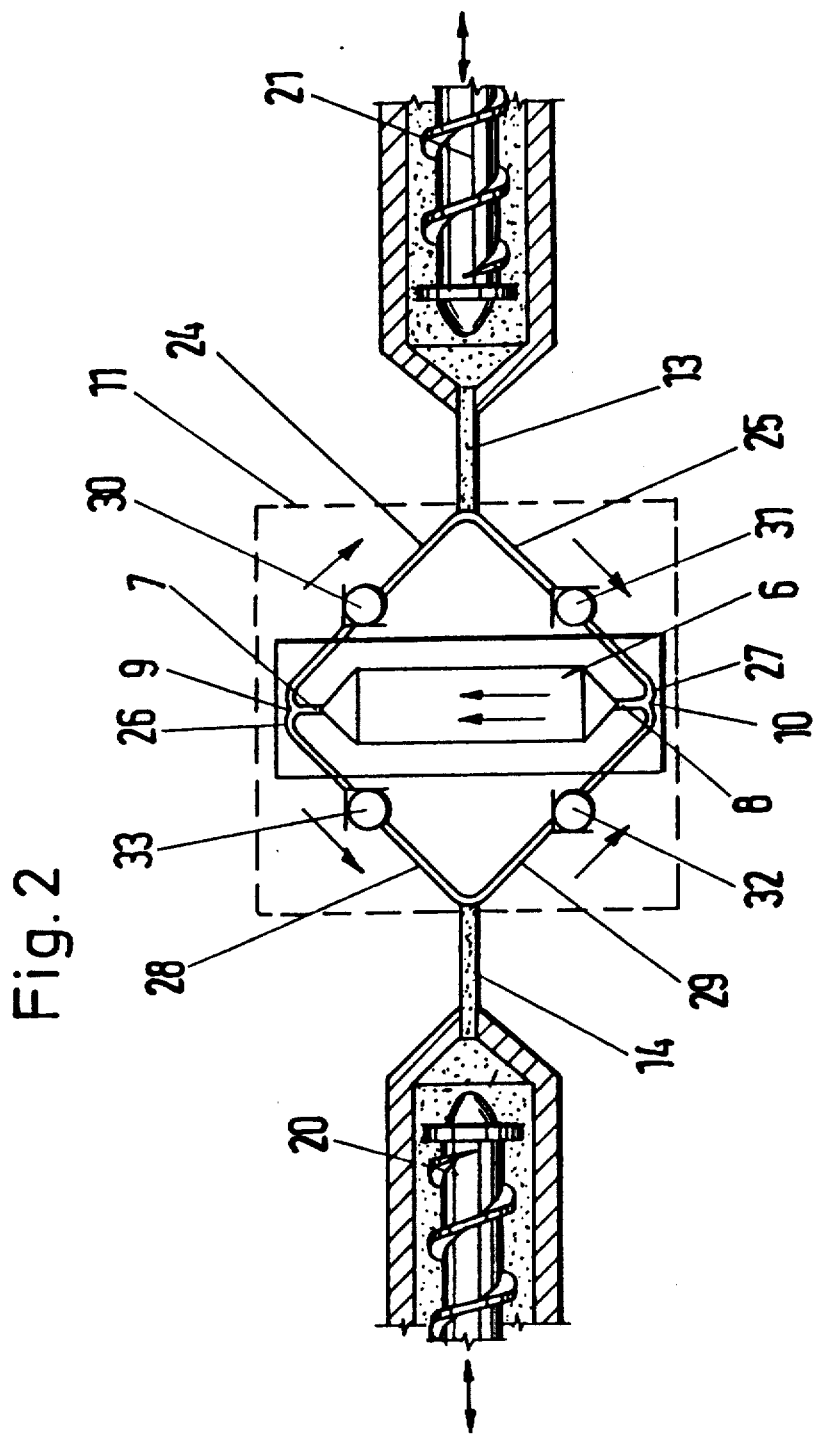
FIG. 2 is a schematic representation of a first embodiment of the heating channel block having valves.
Figure 3:
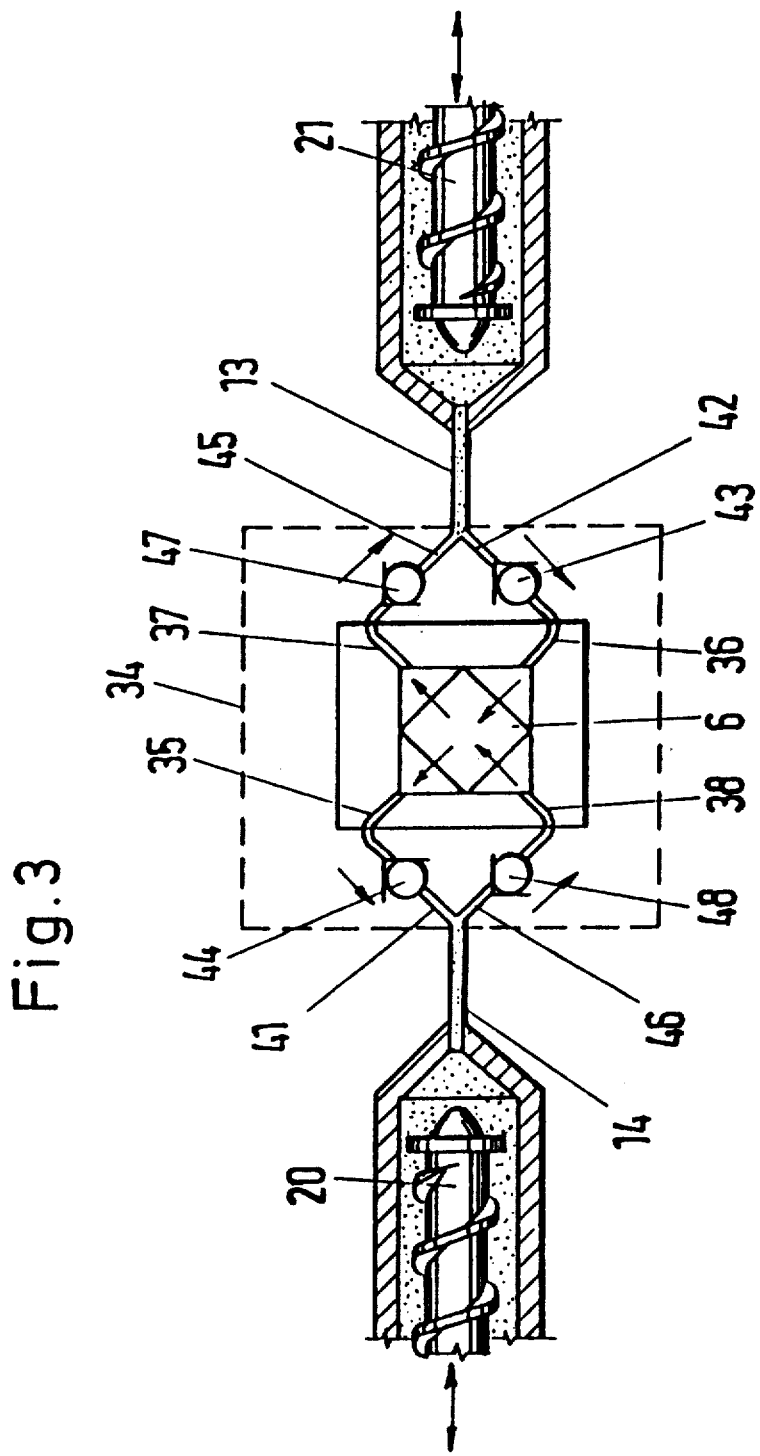
FIG. 3 is a schematic representation of a second embodiment of the heating channel block with the valves.

Mold half 3 is clamped on stationary platen 1 and comprises two gates 7 and 8, which respectively communicate with bores 9 or 10 of a heating channel block 11. The heating channel block is arranged between mold half 3 and stationary platen 1 and thus forms with mold half 3 a constructional and functional unit clamped on the stationary platen. Both bores 9 and 10 lead to a valve arrangement 12, which is shown schematically with a dashed-dotted line in FIG. 1 and whose first and second embodiments are shown in FIGS. 2 and 3. Bores 13 and 14 lead from the valve arrangement 12 to plasticizing and injection units 15 or 16 and communicate therewith.

Known hydraulic control devices of the plasticizing and injection units are denoted as 17 and 18 in the drawing and the electrical control elements common to both as 19 and plasticizing and injection screws are denoted as 20 and 21. Venting valves 22 and 23 are provided at the end of the plasticizing and injection units for the air displaced from the cavity and the gates.

While the system is operating, plasticized material, which forms a cohesive melt stream while the cavity is being filled and the plasticized material is being displaced, and which is under a preset pressure differential owing to the preset hydraulic pressures in the injection cylinders and flows with corresponding speed in both directions through the gates and the cavity, is located in front of the tip of both plasticizing and injection screws.

Referring now to FIG. 2, a first embodiment of the valve arrangement the heating channel block 11 is schematically shown. Elements corresponding with those of FIG. 1 are denoted with the same reference numerals. For the sake of simplification, the arrangement of both plasticizing and injection units 20 and 21 are shown as diametrically opposite one another and heating channel block 11 is shown as a dashed line.

A bore 24 leads from bore 13 to bore 9 and a bore 25 leads from bore 13 to bore 10. Respective branches 26 and 27 are formed at bores 9 and 10 from which bores 28 and 29 respectively lead to the other bore 14.

Figure 4:
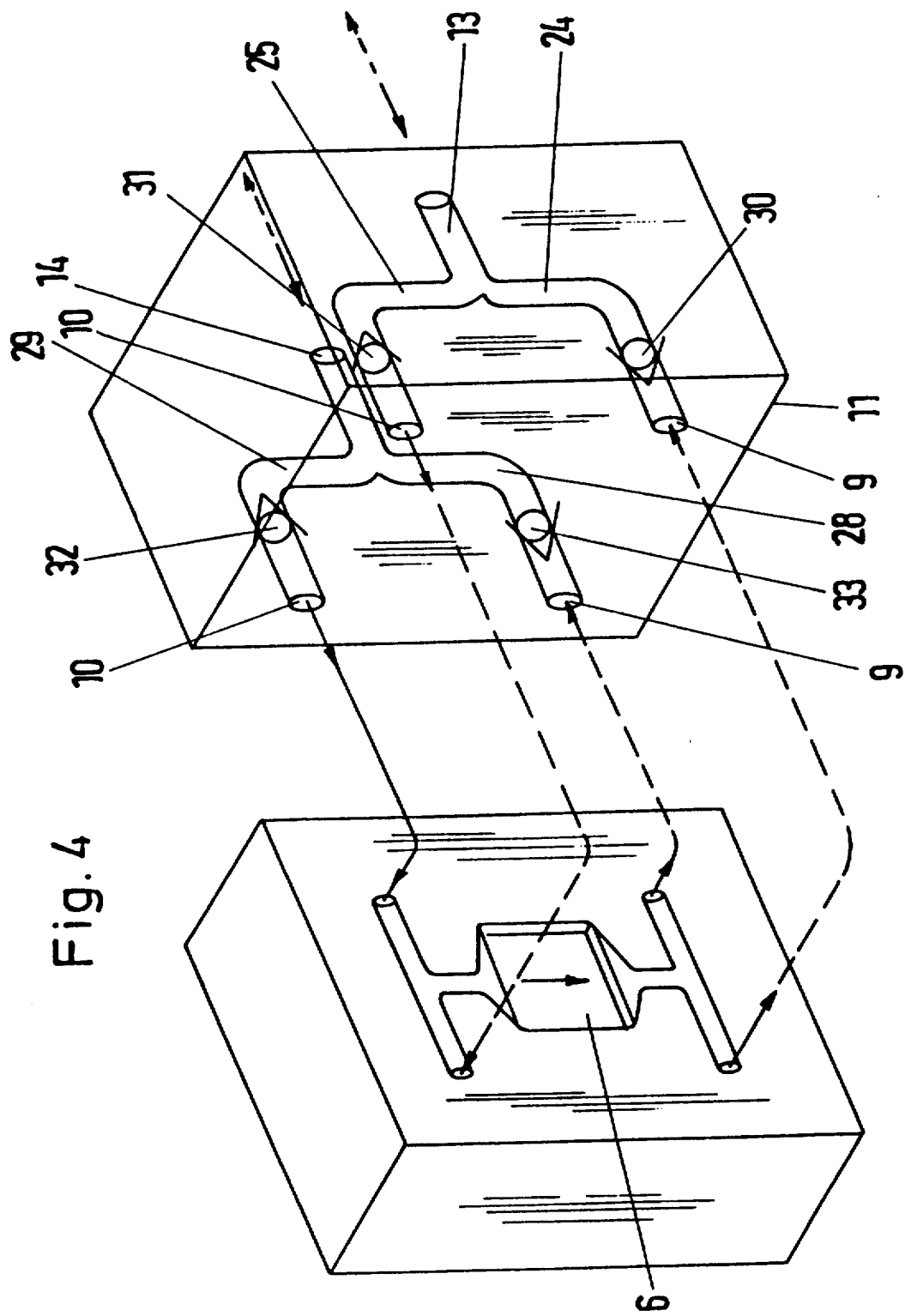
FIG. 4 is an exploded view of the mold and heating channel block of the first embodiment.

One-way valves 30 and 31, both of which are connected antiparallel to one another, are respectively arranged in bores or branches 24 and 25 which form a first passageway with bore 13. One-way valves 32 and 33, both of which are also connected antiparallel, are likewise respectively arranged in bores or branches 28 and 29 which form a second passageway with bore 14. The arrangement corresponds from the point of view of electrical engineering to a full wave rectifier bridge for alternate current, where mold cavity 6 corresponds to the direct current consumers. FIG. 4 is an exploded representation of the embodiment shown in FIG. 2.

At the start up of operation, injection screw 20 moves toward it associated bore 14 while injection screw 21 moves away from its associated bore 13. The flow through bore 14 is moved through branch 29, through one-way valve 32, and into the mold cavity through gate 8. At the same time, some flow will move through branch 28 but will not be able to pass one-way valve 33. In a similar fashion, some flow will move through branch 27 but can not move past one-way valve 31. Once in the mold cavity the flow will move to the top of the cavity, depicted in FIG. 2, through gate 7, and onward through one-way valve 30. Some flow will be forced into branch 26 to one-way valve 33, but will exert very little pressure on branch 28 since the flow of material through bore 14 will be forcing one-way valve 33 in the opposite direction. While injection screw 20 continues to force the flow through the mold cavity, the flow moves through branch 24 and partially flows into bore 13 against a relatively low pressure. This low pressure is caused by the injection screw 21 moving away from the bore 13. Some flow pushed by injection screw 20 will continue through branch 25 and through one-way valve 31 back into the mold cavity.

According to the alternate feed method, injection screw 21 then moves toward bore 13 while injection screw 20 moves away from bore 14. When this happens, the flow of material through bore 13 tries to flow through branch 24 but is stopped by one-way valve 30. Thus, the flow of material through bore 13 moves through branch 25, one-way valve 31, and into the mold cavity through gate 8. Once the flow forced from injection screw 21 reaches the top of the mold cavity depicted in FIG. 2, the flow moves through branch 26, one-way valve 33, branch 28 and into bore 14. The flow enters bore 14 since little pressure is provided at the bore during the movement of injection screw 20 away from bore 14. Some of the flow forced through the mold cavity by injection screw 21 will move toward one-way valve 30, however, this flow is minimal considering the force exerted on the flow from injection screw 21, through bore 13, in the direction of one-way valve 30.

Figure 5:
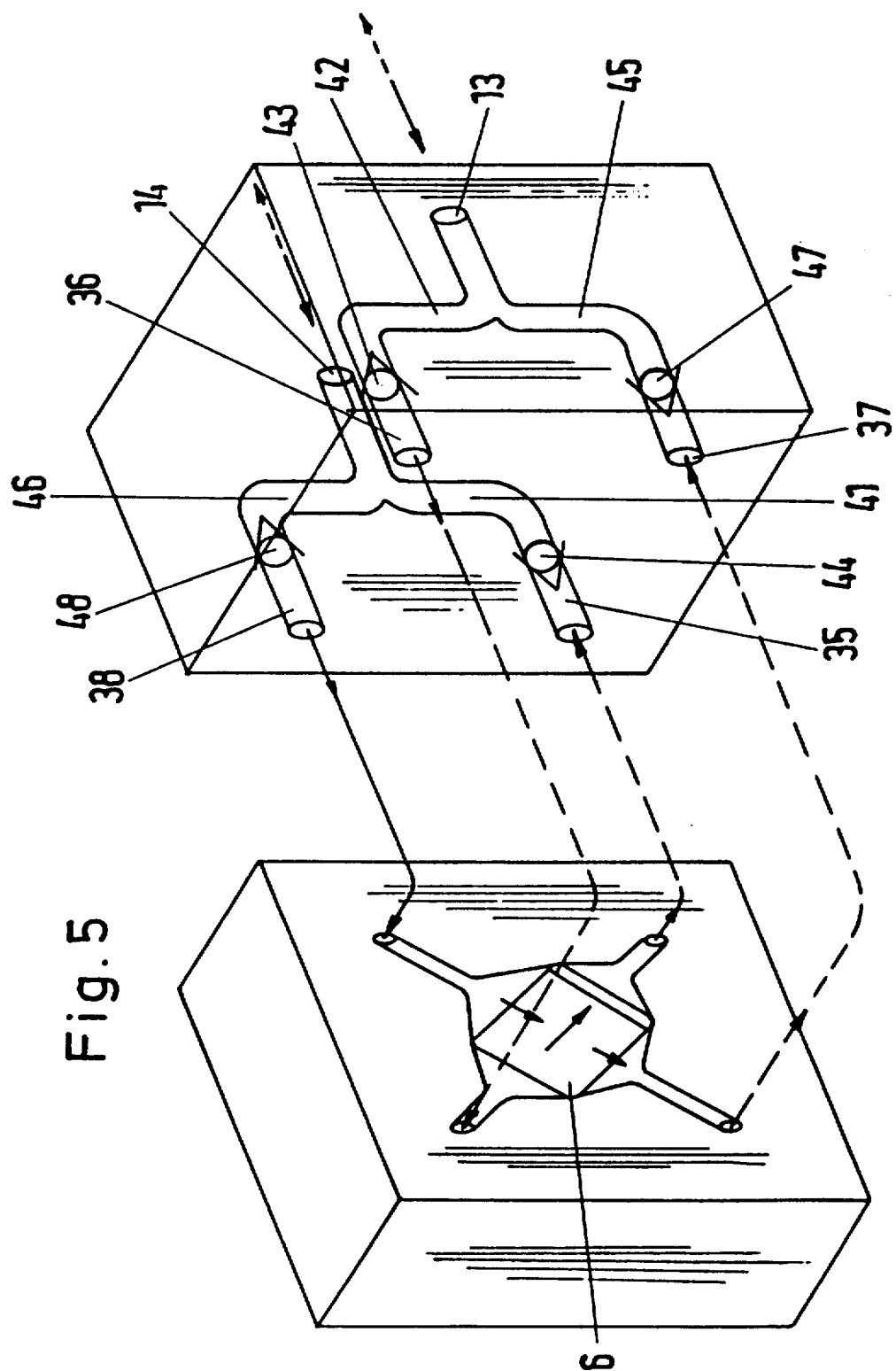
FIG. 5 is an exploded view the mold and heating channel block of the second embodiment.

Turning now to FIG. 3, a second embodiment is schematically shown wherein the heating channel block is denoted as 34. As before, identical parts are labelled with the same reference numerals. The mold, of which only cavity 6 is shown, comprises a first pair of oppositely arranged gates 35 and 36 and a second pair of oppositely arranged gates 37 and 38. Both gates 35 and 36 lie in a plane which is non-parallel with a plane containing gates 37 and 38 and a projection of the axes of the gates forms a specified angle in the mold cavity. As above, bores or branches 42 and 45 form a first passageway along with bore 13 and bores or branches 41 and 46 form a second passageway along with bore 14. Gates 35 and 36 respectively communicate with bores 41 and 42 of the heating channel block, which in turn communicate with bores that respectively empty into the bores 14 and 13 and have valves 44 and 43 connected antiparallel located therein. Gates 37 and 38 likewise respectively communicate with bores 45 and 46, in which respective one-way valves 47 and 48 are connected antiparallel and that also respectively empty into bores 13 and 14. FIG. 5 is an exploded representation of the embodiment shown schematically in FIG. 3.

In operation, the flow of material through the mold shown in FIG. 3 will be similar to the flow of material described with respect to FIG. 2. While injection screw 20 forces the flow through bore 14, injection screw 21 is moved away from bore 13 so that the flow enters bore 13. Upon start-up, injection screw 20 moves toward bore 14 and forces material through branch 46, one-way valve 48, branch 38 and into the mold cavity 6. From there, the flow continues through branch 37, one-way valve 47, branch 45 and into both bore 13 and branch 42. Very little, if any of the flow forced into the mold cavity by injection screw 20 flows through branch 35, one-way valve 44 and into branch 41. This flow is minimized from the force injection screw 20 exerts on the flow through branch 41 toward one-way valve 44. When injection screw 21 then forces the flow through bore 13, injection screw 20 moves away from bore 14. When this happens, the flow moves through branch 42, one-way valve 43, branch 36 and into the mold cavity 6. Very little, if any of the flow moves into branch 37, through one-way valve 47 and into branch 45. The flow forced into the mold cavity from injection screw 21 flows through branch 35, one-way valve 44, branch 41 and into bore 14. This happens due to the low pressure provided by the movement of the injection screw 20 away from bore 14. The results of the alternating feed from injection screws 20 and 21 is a criss-cross flow pattern through the mold cavity 6.

Figure 6:
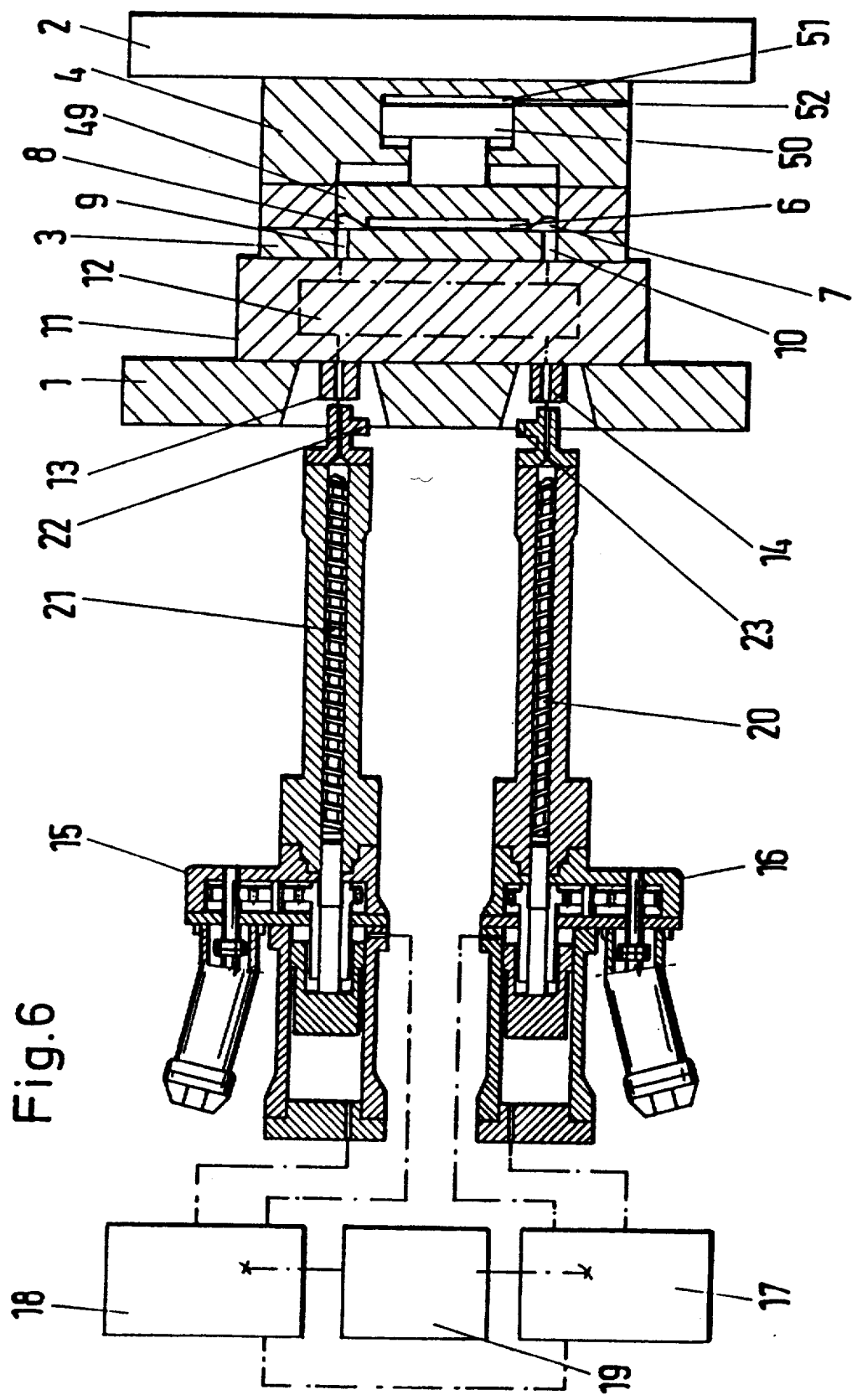
FIG. 6 shows an embodiment of the mold with cavity whose wall thickness can be changed in order to manufacture plywood-like structures.

FIG. 6 shows an embodiment for a mold with movable core carrying the molded part contour. In mold half 4, the movable core 49 is connected to a hydraulic block cylinder 50, which is loaded with pressure through line 52 via pressure chamber 51 prior to the start of the filing operation of the mold and then, while the superposed layers are alternately extruded through a defined release of the oil volume in pressure chamber 51, permits the cavity volume to be increased. The molded part contour may be larger than the contour necessary to form the molded part and contains the contours for the runners.

Further modifications, improvements and substitutions will be apparent to one of skill in the art without departing from the spirit and scope of the present invention as de˜ ed herein and in the following claims.

We claim:

1. An injection mold unit for alternate feed of a plasticized material, comprising:
   first and second plasticizing and injection devices, each said device having a respective bore;
   a mold comprising a heating channel block and a mold cavity, the heating channel having a first passageway connected to the bore of the first plasticizing and injection device, the first passageway having first and second branches in fluid communication with the mold cavity, and a second passageway connected to the bore of the second plasticizing and injection device, said second passageway having first and second branches in fluid communication with the mold cavity; and
   one way valves located in each of the first and second branches of the first and second passageways to control a flow of plasticized material, the one way valves respectively located in the first branches of the first and second passageways controlling a flow of plasticized material in a first direction from said first plasticizing and injection device, through the mold cavity, and to the second plasticizing and injection device, and the one way valves respectively located in the second branches of the first and second passageways controlling a flow of plasticized material in a second direction from said second plasticizing and injection device, through said mold cavity, and to said first plasticizing and injection device, whereby plasticized material is alternately fed from said first and second devices to and through the mold cavity, and said first and second plasticizing and injection devices are controlled during operation such that while an injection screw of the first device moves in a direction toward the corresponding bore of the first device an injection screw of the second device moves in a direction away from the corresponding bore of the second device.

2. The injection mold unit according to claim 1, wherein the first branch of the first passageway and the second branch of the second passageway are connected to the mold cavity via a first mold gate, and wherein the first branch of the second passageway and the second branch of the first passageway are connected to the mold cavity via a second mold gate.

3. The injection mold unit according to claim 1, further comprising a first mold gate located between the mold cavity and the first branch of the first passageway, a second mold gate located between the mold cavity and the first branch of the second passageway, a third mold gate located between the mold cavity and the second branch of the first passageway, and a fourth mold gate located between the mold cavity and the second branch of the second passageway.

4. The injection mold unit according to claim 3, wherein the first and second mold gates lie in a first plane and the third and fourth mold gate lie in a second plane which is nonparallel with the first plane.

5. The injection mold unit according to claim 1, wherein the mold cavity is defined by two mold halves and the first and second branches of both the first and second passageways communicate with the mold cavity via one mold half, wherein the other mold half comprises a movable core located within the mold cavity and having a contour facing the one mold half, whereby the movable core moves away from the one mold half as plasticized material is alternately fed into and through the mold cavity.

* * * * *